Oct. 4, 1927.　　　　　J. H. MADISON　　　　　1,644,598
BRAKE SHOE
Filed Jan. 8, 1927
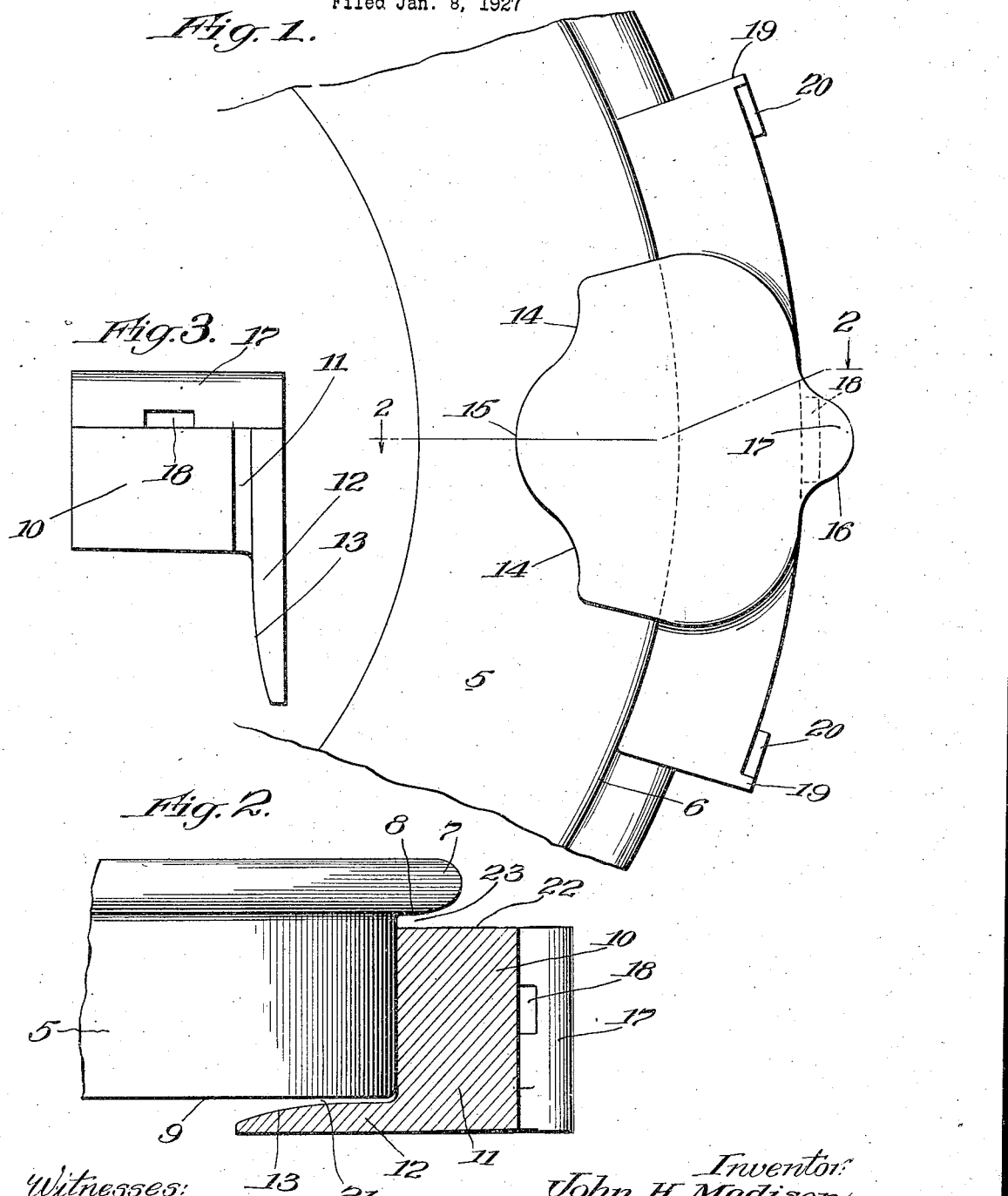
Witnesses:
P. F. Gathmann
Inventor:
John H. Madison.
By Mason Fenwick & Lawrence
his Attorneys Patented Oct. 4, 1927.

1,644,598

UNITED STATES PATENT OFFICE.

JOHN H. MADISON, OF BURLINGTON, IOWA, ASSIGNOR OF ONE-HALF TO RUDOLPH FRICK, OF BURLINGTON, IOWA.

BRAKE SHOE.

Application filed January 8, 1927. Serial No. 159,837.

This invention relates to brake shoes and the object thereof is to provide a novel and improved construction of brake shoe which will not work or slip towards the flange of the wheel on which it is operating and gradually cut the flange away, which happens quite frequently with brake shoes now in use. Specifically, the shoe is provided with a novel flange of tapered formation which engages over the outer face or side of the wheel and prevents undue wear thereon, as well as preventing the brake shoe from wearing the flange of the wheel or neck of the tire thereof, thereby preventing heating of the flanges by keeping the brake shoes away from the flanges and preventing cracking thereof due to expansion and contraction.

Further objects of the invention are, to obtain greater, possibly 100% brake shoe wear, to provide both wheels with equal braking power or traction so that both wheels will operate with equal efficiency instead of one wheel getting all of the braking power and having a tendency to loosen one of the wheels and reducing the braking force; to give one-fourth more braking power; to prevent 75% of the broken flanges; to permit increased train tonnage by reducing brake shoe friction against the flanges; to reduce the cost of maintenance and prevent costly wrecks; to prevent splitting of facing point switches; also to keep the wheels from climbing the rails and causing derailments; to keep the brake beams from climbing the wheels; and by keeping the cars off of repair tracks, will reduce the claims for loss of delay and damage to shipments. The brake shoe in use now is causing 75% sharp flanges.

Other objects and advantages will be apparent as the description proceeds.

This brake shoe is applied to the brake beam in the same manner as the standard brake shoe now in use.

In the accompanying drawings:

Figure 1 is a side elevation of a fragmentary portion of a wheel having the improved brake shoe applied thereto.

Figure 2 is a horizontal sectional view taken on the section line 2—2 of Figure 1, and Figure 3 is an edge view of the device.

Referring to the drawings in detail, in which similar characters represent corresponding parts throughout the several views, 5 designates a wheel having the usual tread 6, and at its inner side, the flange 7 at the neck of the wheel tire or tread which is usually worn by the shoes at the point 8. The face of the wheel is designated at 9.

The improved shoe is usually uniform cross section and designated at 10 and has an offset 11 at its outer face of the same thickness as the shoe proper on which is provided a flange 12 which extends beyond the engaging face of the shoe and is slightly tapered at its lower or inner end as indicated at 13 on its inner face and preferably turned outwardly as shown in Fig. 2 in tapered thickness. This flange is also preferably provided with a reversely curved free edge concaved as at 14 near each end and convex in the center as indicated at 15, but may be formed straight or concaved in the usual manner if desired.

The flange at the outer side of the shoe is projected as indicated at 16 contiguous with a cross rib 17 having an opening 18 for connection with the brake beam. This opening extends entirely through the rib 17. The ends of the shoe are provided with projecting flanges 19 which may be reinforced with blocks 20 or ribs formed adjacent thereto.

It will be seen that in the operation of the device, the depending or outer flange 12 which is slightly tapered at its lower end or inner end with respect to the wheel, while normally spaced from the face of the wheel as indicated at 21, will engage the face of the wheel near its tread should it tend to work or slip towards the flange of the wheel on which it is operating but by reason of the inner side 22 of the shoe being spaced from the flange 7 at the crotch or neck 8 as indicated at 23, the inner edge of the shoe will be prevented from engaging the beating or gradually wearing out the flange or neck portion of the wheel tread or flange adjacent thereto at the tire portion of the wheel. Since the flange of the wheel is the only thing that holds the train on the track, therefore, if the flanges are gradually cut away by the brake shoes, the train is bound to leave the track. If wear on the flanges is prevented as with the present construction, derailing will thus be prevented. Furthermore, by reason of the tapered formation 13 of the shoe flange, while the flange of the shoe may engage the wheel near its periphery, that is, at the tread portion or tire, the inner side of the shoe will be prevented from engaging the flange 7 of the wheel, the only engagement being with the outer face of the car wheel or on the opposite side with respect to the flange thereof. By the present construction, the brake shoe is absolutely retained in position and due to the formation at the inner side or lower end of the flange of the shoe at its tapered portion, the wear on the outer face of the wheel at its tread portion or tire is reduced to a minimum. In Figure 1 the wheel is indicated with the tread portion or tire represented by two concentric lines the innermost of which represents the inner portion of the tread.

As to the loosening of the wheels, all wheels running on rails are pressed on the axle under certain pressure and revolve with the axle, therefore, if one of the wheels is held by braking power due to unequal brake shoe friction on the face of the wheel it is liable to cause a twisting action between the wheels and cause one or the other to loosen on the axle.

With reference to preventing 75% broken flanges, due to brake shoe wear against the flange causing it to get sharp and thin, the other 25% we charge to defective parts from manufacture and rail wear.

While I have described my invention in a preferred form, it is to be understood that various changes may be made in the construction and proportion of the parts shown without departing from the spirit and scope of the invention as defined by the following claims.

Having thus described my invention what I claim is:

1. A brake shoe for flanged wheels provided with a flange at its outer edge adapted to engage with the unflanged side of the wheel and thereby prevent the shoe from wearing into the neck of the tire of the wheel, said flange being tapered towards its inner edge.

2. In a brake shoe for flanged wheels, said shoe being narrower than the wheel tread and provided with a flange on its outer edge adapted to engage over the outer face of the wheel and keep the inner side of the shoe in spaced relation to the wheel flange.

3. A brake shoe of the class described comprising a shoe proper having an offset intermediately and a flange projecting inwardly from the offset adapted to engage the face of the wheel to prevent the opposite side of the shoe from engaging the flange of the wheel.

4. A brake shoe for flanged wheels having an offset portion at its outer side with an inwardly extending flange tapered on its inner face and curved outwardly away from the outer face of the wheel to engage said face adjacent the engaging face of the shoe, said shoe being of a width normally spaced from the flange of the wheel at its inner side and having means for attachment to a brake beam.

5. A brake shoe for flanged wheels having an offset portion at its outer side with an inwardly extending flange tapered on its inner face and curved outwardly away from the outer face of the wheel to engage said face adjacent the engaging face of the shoe, said shoe being of a width normally spaced from the flange of the wheel at its inner side and ribs on the outer face of the shoe including a central rib having an opening for attachment to brake beam.

6. A brake shoe of the class described comprising a shoe of uniform cross-section proper having an offset intermediately and a flange projecting inwardly from the offset adapted to engage the face of the wheel to prevent the opposite side of the shoe from engaging the flange of the wheel, said flange being curved outwardly on its inner face.

In testimony whereof I affix my signature.

JOHN H. MADISON.